US008208885B1

(12) United States Patent
Lam

(10) Patent No.: US 8,208,885 B1
(45) Date of Patent: Jun. 26, 2012

(54) VARIABLE TIME, PHASE, AND AMPLITUDE CONTROL DEVICE

(75) Inventor: Lawrence K. Lam, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 266 days.

(21) Appl. No.: 12/722,625

(22) Filed: Mar. 12, 2010

Related U.S. Application Data

(60) Provisional application No. 61/162,994, filed on Mar. 24, 2009, provisional application No. 61/161,382, filed on Mar. 18, 2009, provisional application No. 61/162,226, filed on Mar. 20, 2009.

(51) Int. Cl.
*H04B 1/20* (2006.01)

(52) U.S. Cl. .................................... 455/273; 455/276.1

(58) Field of Classification Search .................... 455/26, 455/272, 273, 275, 276.1, 278.1, 295, 296, 455/304; 333/32, 109, 126, 202, 205, 206
See application file for complete search history.

(56) References Cited

U.S. PATENT DOCUMENTS

| | | | | | |
|---|---|---|---|---|---|
| 5,222,246 | A * | 6/1993 | Wolkstein | ..................... | 455/304 |
| 6,016,304 | A | 1/2000 | Kyle et al. | | |
| 7,009,560 | B1 | 3/2006 | Lam et al. | | |
| 7,466,970 | B2 * | 12/2008 | Niiranen et al. | .............. | 455/269 |
| 7,526,263 | B2 * | 4/2009 | Niiranen et al. | ........... | 455/276.1 |
| 2004/0080705 | A1 | 4/2004 | Koh et al. | | |
| 2009/0296856 | A1 * | 12/2009 | Smith et al. | ................... | 455/295 |

* cited by examiner

*Primary Examiner* — Thanh Le
(74) *Attorney, Agent, or Firm* — Fraser Clemens Martin & Miller LLC; J. Douglas Miller

(57) ABSTRACT

A signal conditioning device includes a substrate including at least one transmission line integrated therewith, a power divider for receiving an input signal and dividing the input signal into a plurality of divided signals, a plurality of time delay paths, each of the time delay paths coupled to an output of the power divider to receive at least one of the divided signals, wherein at least one of the time delay paths is in signal communication with the at least one transmission line to define a time delay associated therewith, a control device in signal communication with at least one of the time delay paths and controlling at least one of a phase shift and an amplitude of at least one of the divided signals, and a power combiner for receiving the divided signals and combining the signals into an output signal.

20 Claims, 6 Drawing Sheets

VARIABLE TIME, PHASE, AND AMPLITUDE CONTROL DEVICE

CROSS-REFERENCE TO RELATED APPLICATION

This application claims the benefit of U.S. provisional patent application Ser. Nos. 61/162,994 filed Mar. 24, 2009; 61/161,382 filed Mar. 18, 2009; and 61/162,226 filed Mar. 20, 2009, each of which are hereby incorporated herein by reference in its entirety.

STATEMENT REGARDING GOVERNMENT SPONSORED RESEARCH OR DEVELOPMENT

Not Applicable.

FIELD OF THE INVENTION

The present invention generally relates to radio frequency (RF) signal conditioning. In particular, the invention is directed to a device for providing selective and variable control over a time delay, amplitude, and phase of an RF signal.

BACKGROUND OF THE INVENTION

Providing precision control over the time delay, amplitude and phase delay of a radio frequency (RF) signal is fundamental to many applications that require precision and programmable RF signal conditioning. These applications include wideband array beam formation and diversity aperture combining.

In conventional true time delay devices, a control of time delays and phase is not independent from each other. Changing the time delay affects the phase delay of the carrier of the signal. The coupling of time delay and phase delay creates complexity at the system level, and is not desired for applications that require advanced signal conditioning techniques.

It would be desirable to develop a signal conditioning device for providing selective, independent, and variable control over a time delay, amplitude, and phase of a radio frequency signal, wherein the device can be implemented using radio frequency integrated circuit technology.

SUMMARY OF THE INVENTION

Concordant and consistent with the present invention, a signal conditioning device for providing selective, independent, and variable control over a time delay, amplitude, and phase of a radio frequency signal, wherein the device can be implemented using radio frequency integrated circuit technology, has surprisingly been discovered.

In one embodiment, a signal conditioning device comprises: a substrate including at least one transmission line integrated therewith; a power divider for receiving an input signal and dividing the input signal into a plurality of divided signals; a plurality of time delay paths, each of the time delay paths coupled to an output of the power divider to receive at least one of the divided signals, wherein at least one of the time delay paths is in signal communication with the at least one transmission line to define a time delay associated therewith; a control device in signal communication with at least one of the time delay paths and controlling at least one of a phase shift and an amplitude of at least one of the divided signals; and a power combiner for receiving the divided signals and combining the signals into an output signal.

In another embodiment, a signal conditioning device comprises: a substrate including at least one transmission line integrated therewith; a power divider for receiving an input signal and dividing the input signal into a plurality of divided signals; a plurality of time delay paths, each of the time delay paths coupled to an output of the power divider to receive at least one of the divided signals, wherein at least one of the time delay paths is in signal communication with the at least one transmission line to define a time delay associated therewith; a phase shifter circuit in signal communication with at least one of the time delay paths for controlling a phase of at least one of the divided signals, independent of the time delay associated therewith; and an amplitude control circuit in signal communication with at least one of the time delay paths for controlling an amplitude of at least one of the divided signals, independent of the time delay associated therewith; and a power combiner for receiving the divided signals and combining the signals into an output signal.

In yet another embodiment, a signal conditioning device comprises: a substrate including at least one transmission line integrated therewith; and a die mounted on the substrate, the die including a signal conditioning circuit having: a power divider for receiving an input signal and dividing the input signal into a plurality of divided signals; a plurality of time delay paths, each of the time delay paths coupled to an output of the power divider to receive at least one of the divided signals, wherein at least one of the time delay paths is in signal communication with the at least one transmission line to define a time delay associated therewith; a plurality of control devices for controlling at least one of a phase shift and an amplitude of at least one of the divided signals, wherein at least one of the control devices is disposed along each of the time delay paths and in signal communication therewith; and a power combiner for receiving the divided signals and combining the signals into an output signal.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
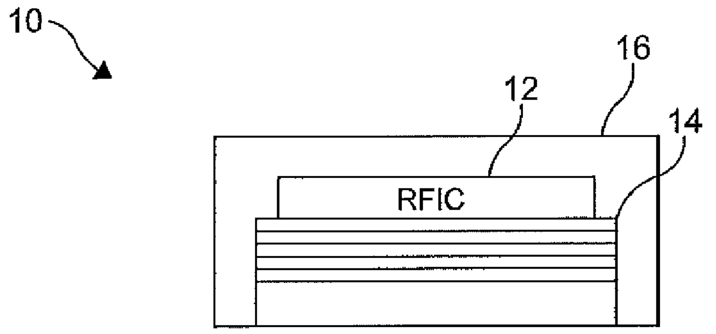
FIG. 1 is a schematic representation of a signal conditioning device according to an embodiment of the present invention.
Figure 2:
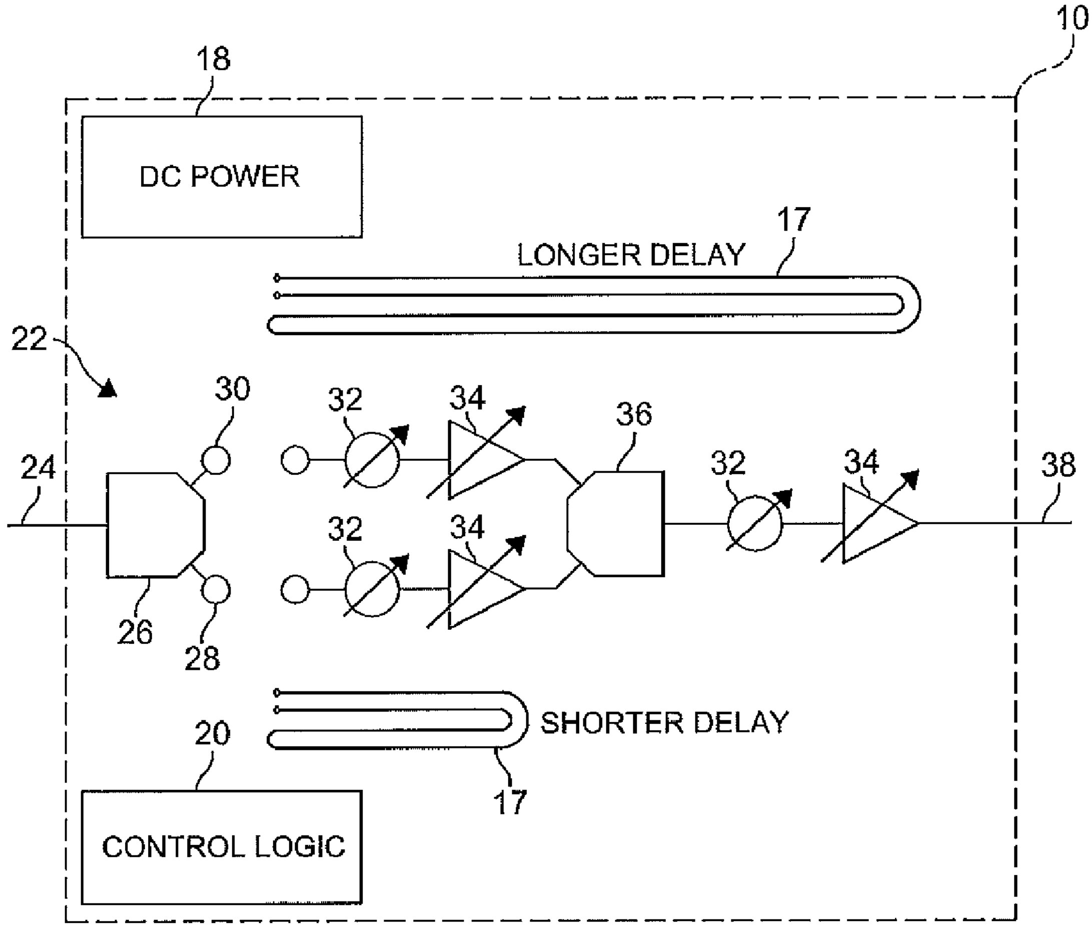
FIG. 2 is a schematic representation of the signal conditioning device of FIG. 1 showing a signal conditioning circuit according to an embodiment of the present invention.

FIGS. 1-2 illustrate a signal conditioning device 10 (also referred to as a time amplitude phase control device or TAP device 10) for providing selective, independent, and variable control over a time delay, an amplitude, and a phase of a radio frequency signal, according to an embodiment of the present invention. As shown, the TAP device 10 is implemented as a packaged radio frequency integrated circuit (RFIC) having a die 12 mounted to a substrate 14 and enclosed in a package 16. As a non-limiting example, the substrate 14 is a multi-layer circuit board including a plurality of striplines 17 or conductive transmission lines integrated therewith to provide predetermined time delays. As a non-limiting example, the striplines 17 are embedded within the substrate 14. It is understood that any number of the striplines 17 can be used. It is further understood that any substrate material can be used. In certain embodiments, the striplines 17 are integrated into the package 16 and the die 12 is mounted directly thereto, wherein the package 16 operates as a substrate. Any substrate and packaging technique can be used. For example, the TAP device 10 may be packaged using a liquid crystal polymer package, a quad fiat no lead (QFN) package, or any other surface mount technology, now known or later developed.

As more clearly shown in FIG. 2, the TAP device 10 includes a power supply 18, a control logic 20, and a signal conditioning circuit 22. In certain embodiments, at least one of the power supply 18 and the control logic 20 is integrated with the die 12. However, other configurations can be used.

The power supply 18 is typically a direct current (DC) power supply. However, any source of electrical energy can be used.

The control logic 20 includes circuits for selectively activating and adjusting the various components of the TAP device 10. It is understood that the control logic 20 may be used for any of a variety of other suitable functions for the TAP device 10. It is further understood that the control logic 20 may include any number of hardware and software components to route and process signals and control the functionality of the signal conditioning circuit 22.

The signal conditioning circuit 22 is typically disposed on the die 12 or embedded therein. However, other configurations can be used. The signal conditioning circuit 22 includes an input 24 to receive a signal (e.g. radio frequency signal) and direct the signal to a two-way power divider 26. As a non-limiting example, the power divider 26 is an in-phase power divider such as a MA/COM DS-327. However, other power dividers can be used such as a Wilkinson power divider, for example. The outputs of the power divider 26 are coupled to a first time delay path 28 and a second time delay path 30, respectively. It is understood that a length of each of the time delay paths 28, is selectively varied by coupling the delay paths 28, 30 to one of the striplines 17 embedded in the substrate 14 or package 16, thereby independently varying a time delay associated with a signal transmitted therethrough.

A plurality of control devices, namely a phase shifter 32 and a variable gain amplifier 34, are disposed along each of the delay paths 28, 30 to provide selective, variable, and independent control over a phase and amplitude of the signals transmitted therethrough. As a non-limiting example, the phase shifters 32 and the variable gain amplifiers 34 are controlled in accordance with the methods disclosed in commonly owned U.S. Pat. No. 7,009,560, hereby incorporated herein by reference in its entirety. The signals transmitted through the delay paths 28, 30 are directed to a two-way power combiner 36. Another of the phase shifter 32 and the variable gain amplifier 34 are in signal communication with an output of the power combiner 36 to provide phase and amplitude control over a signal transmitted to the output 38 of the TAP device 10. In certain embodiments, the control devices 32, 34 disposed at the output 38 are different than the phase shifter 32 and the amplifier 34 disposed along the time delay paths 28, 30.

It is understood that any number of control devices can be used to adjust a phase and amplitude of a signal transmitted through the TAP device 10. It is further understood that any type of control device can be used to provide control over at least one of the phase and amplitude of a signal transmitted through the TAP device 10 such as a variable attenuator and an I and Q vector modification circuit, for example.

Figure 3:
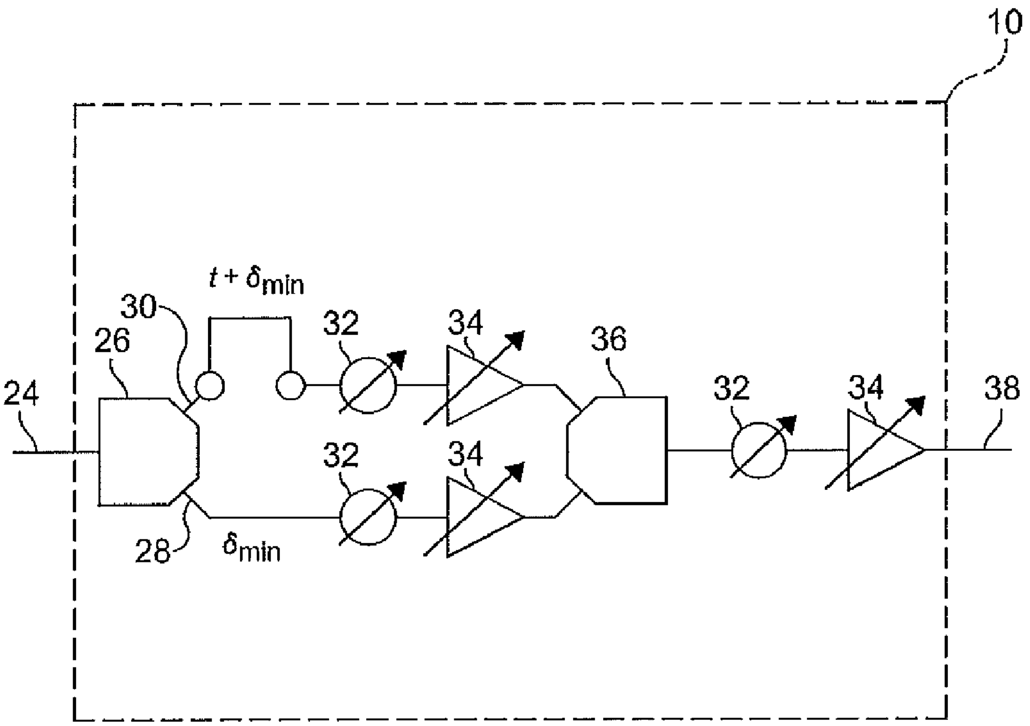
FIG. 3 is a schematic representation of the signal conditioning circuit of FIG. 2 showing a first time delay configuration.

FIG. 3 illustrates the signal conditioning circuit 22 having a first time delay configuration. As shown, the first time delay path 28 has a length to produce a time delay of $\delta_{min}$ and the second time delay path 30 has a length to produce a time delay of $t+\delta_{min}$.

Figure 4:
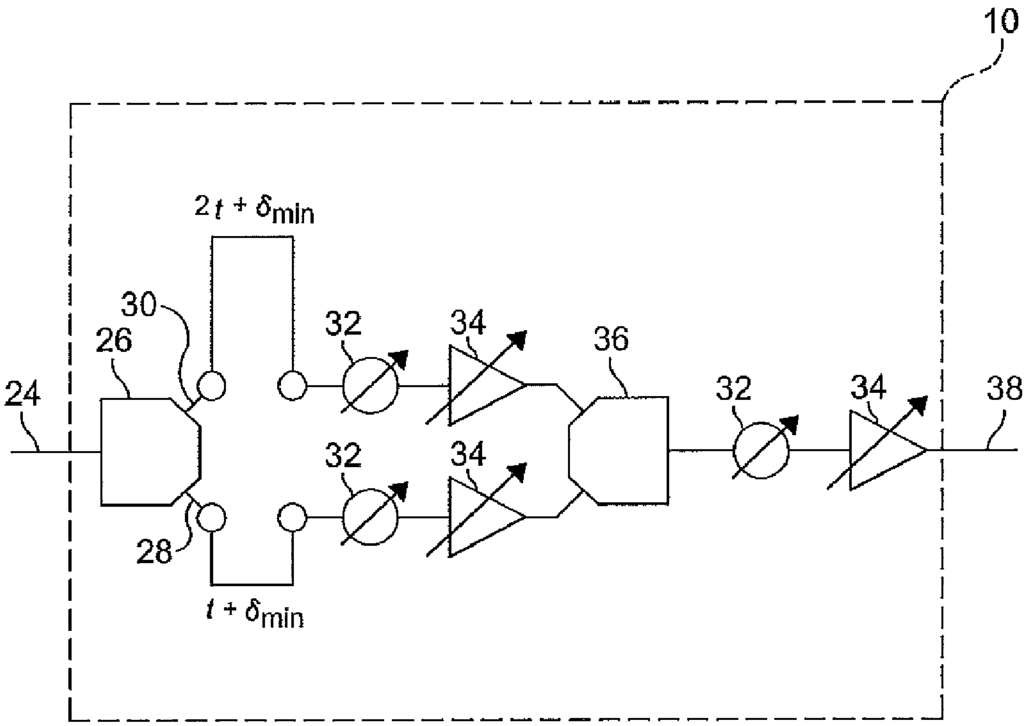
FIG. 4 is a schematic representation of the signal conditioning circuit of FIG. 2 showing a second time delay configuration.

FIG. 4 illustrates the signal condition circuit 22 having a second time delay configuration. As shown, the first time delay path 28 has a length to produce a time delay of $t+\delta_{min}$ and the second time delay path 30 has a length to produce a time delay of $2\ t+\delta_{min}$.

In use, the power divider 26 receives a signal from the input 24 of the TAP device 10 and generates a plurality of divided signals. Each of the divided signals is routed through at least one of the time delay paths 28, 30 for signal conditioning. A time delay of each of the divided signals is determined by a length of an associated one of the time delay paths 28, 30. It is understood that any of the divided signals can be routed through any of the striplines 17 disposed in the substrate 14 or package 16. The phase shifter 32 and amplifier 34 (i.e. control devices) selectively and independently control a phase and amplitude of the divided signal transmitted through an associated one of the time delay paths 28, 30. As a non-limiting example the control logic 20 controls the functionality of at least one of the phase shifter 32 and the amplifier 34. The divided signals are combined by the power combiner 36 to form an output signal that is transmitted through the output 38. A phase and an amplitude of the output signal can be adjusted by the phase shifter 32 and the amplifier 34 disposed between the output 38 and the power combiner 36.

Figure 5:
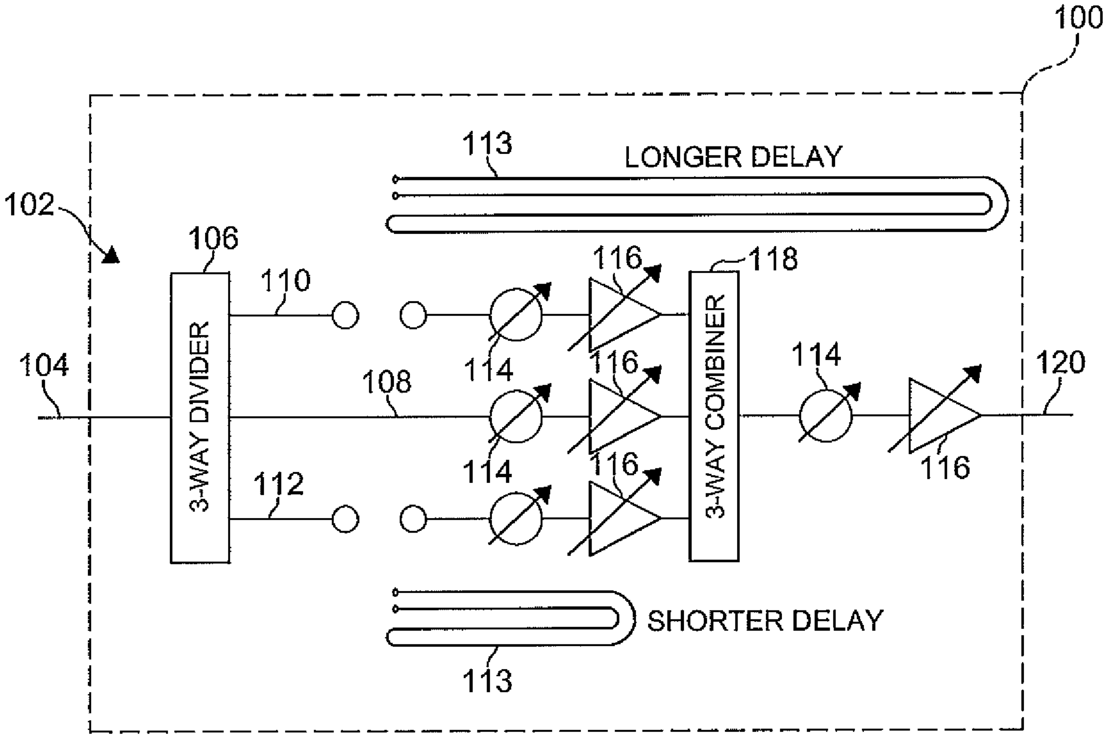
FIG. 5 is a schematic representation of a signal conditioning device according to another embodiment of the present invention.

FIG. 5 illustrates a tap device 100 according to another embodiment of the present invention similar to the tap device 10 except as described herein below. Specifically, a signal condition circuit 102 of the tap device 100 includes an input 104 to receive a signal (e.g. radio frequency signal) and direct the signal to a three-way power divider 106. The outputs of the power divider 106 are coupled to a first time delay path 108, a second time delay path 110, and a third time delay path 112, respectively. It is understood that a length of each of the time delay paths 108, 110, 112 is selectively varied by coupling the delay paths 108, 110, 112 to one of a plurality of striplines 113 thereby independently varying a time delay associated with a signal transmitted therethrough. A plurality of control devices, namely a phase shifter 114 and a variable gain amplifier 116, are disposed along each of the delay paths 108, 110, 112 to provide selective, variable, and independent phase and amplitude control over the signals transmitted therethrough. As a non-limiting example, the phase shifters 114 and the variable gain amplifiers 116 are controlled in accordance with the methods disclosed in commonly owned U.S. Pat. No. 7,009,560. The signals transmitted through the delay paths 108, 110, 112 are directed to a three-way power combiner 118. Another phase shifter 114 and variable gain amplifier 116 are in signal communication with an output of the power combiner 118 to provide phase and amplitude control over a signal transmitted to the output 120. In certain embodiments, the control devices 114, 116 disposed at the output 120 are different than the phase shifter 114 and the amplifier 116 disposed along the time delay paths 108, 110, 112. It is understood that any number of control devices 114, 116 can be used to adjust a phase and amplitude of a signal transmitted through the TAP device 100. It is further understood that any type of control device can be used to provide control over at least one of the phase and amplitude of a signal transmitted through the TAP device 100 such as a variable attenuator and an I and Q vector modification circuit, for example.

Figure 6:
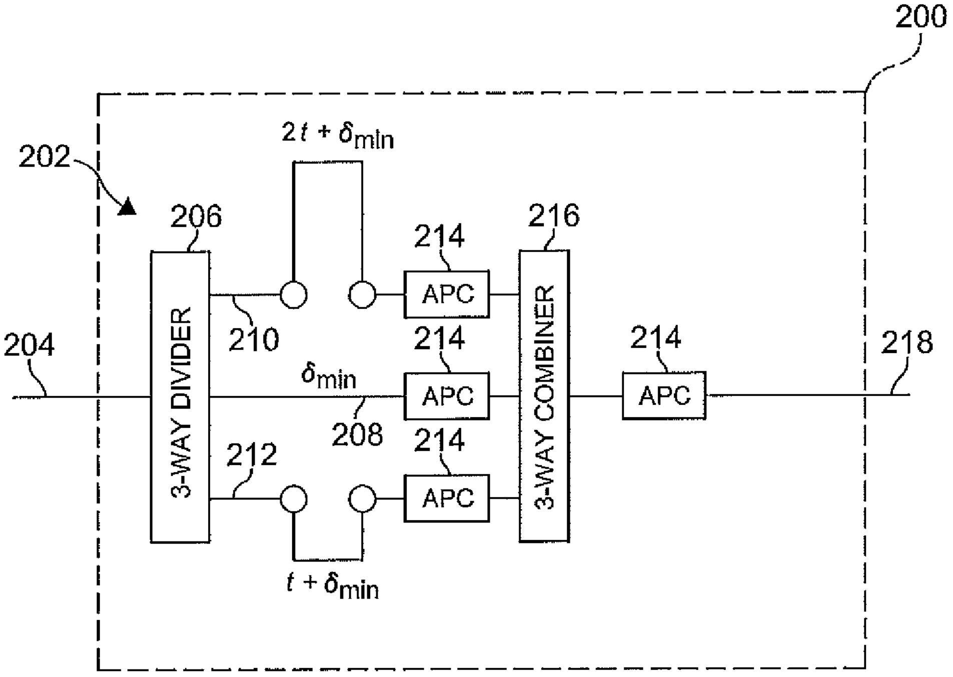
FIG. 6 is a schematic representation of a signal conditioning device according to another embodiment of the present invention.

FIG. 6 illustrates a tap device 200 according to another embodiment of the present invention similar to the tap device 100 except as described herein below. Specifically, a signal condition circuit 202 of the tap device 200 includes an input 204 to receive a signal (e.g. radio frequency signal) and direct the signal to a three-way power divider 206. The outputs of the power divider 206 are coupled to a first time delay path 208, a second time delay path 210, and a third time delay path 212, respectively. It is understood that a length of each of the time delay paths 208, 210, 212 is selectively varied by coupling the delay paths 208, 210, 212 to one of a plurality of striplines (not shown), thereby independently varying a time delay associated with a signal transmitted therethrough. An amplitude/phase control device (APC) 214 is disposed along each of the delay paths 208, 210, 212 to provide selective, variable, and independent control over at least one of a phase and an amplitude of the signals transmitted therethrough. As a non-limiting example, the APC's 214 are similar to the control device described in U.S. Pat. No. 6,016,304, hereby incorporated herein by reference in its entirety. However, it is understood that other devices for controlling at least one of a phase and an amplitude of a signal can be used such as variable phase shifters, variable gain amplifiers, and I and Q signal processing devices or systems. The signals transmitted through the delay paths 208, 210, 212 are directed to a three-way power combiner 216. Another APC 214 is in signal communication with an output of the power combiner 216 to provide phase and amplitude control over a signal transmitted to an output 218. In certain embodiments, the control device 214 disposed at the output 218 is different than the APC 214 disposed along the time delay paths 208, 210, 212. It is understood that any number of control devices 214 can be used to adjust a phase and amplitude of a signal transmitted through the TAP device 200. It is further understood that any type of control device can be used to provide control over at least one of the phase and amplitude of a signal transmitted through the TAP device 200 such as a variable attenuator and an I and Q vector modification circuit, for example.

In the embodiment shown in FIG. 6, the first time delay path 208 has a length to produce a time delay of $\delta_{min}$, the second time delay path 210 has a length to produce a time delay of 2 $t+\delta_{min}$, and the third time delay path 212 has a length to produce a time delay of $t+\delta_{min}$. It is understood that any the paths 208, 210, 212 can have any length to provide any time delay.

Figure 7:
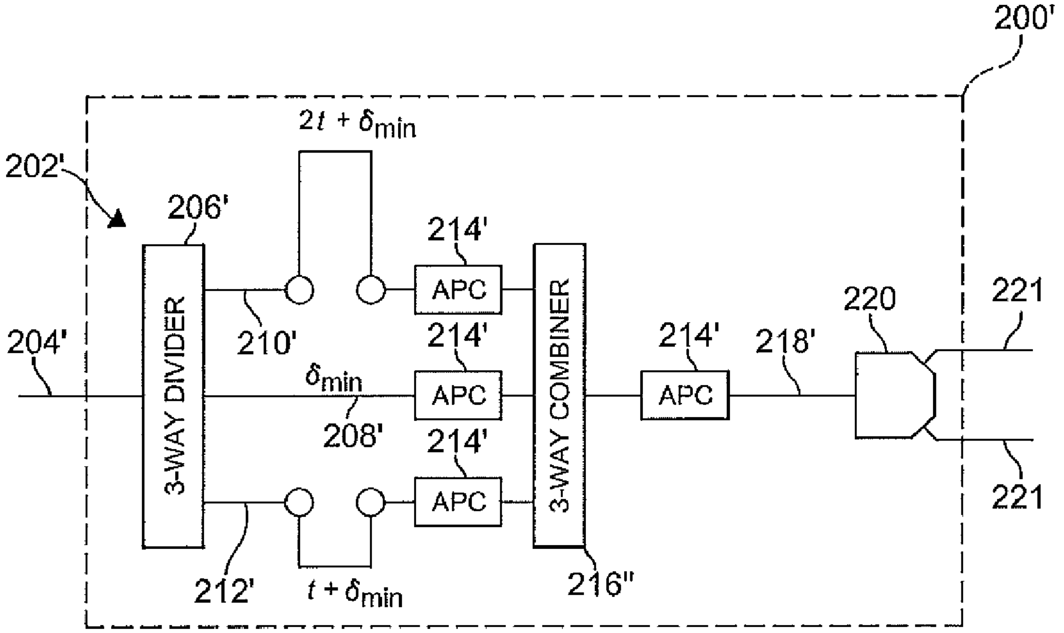
FIG. 7 is a schematic representation of a signal conditioning device according to another embodiment of the present invention.

FIG. 7 illustrates a TAP device 200' according to another embodiment of the present invention similar to the TAP device 200 of FIG. 6 except as described below. Structure repeated from the description of FIG. 6 includes the same reference numeral and a prime (') symbol. As shown, a signal condition circuit 202' includes a power divider 220 coupled to an output 218' to divide the output signal into a plurality of divided output signals. As a non-limiting example the power divider 220 is a two-way power divider having a pair of divided outputs 221. However, any number of divided outputs can be used.

Figure 8:
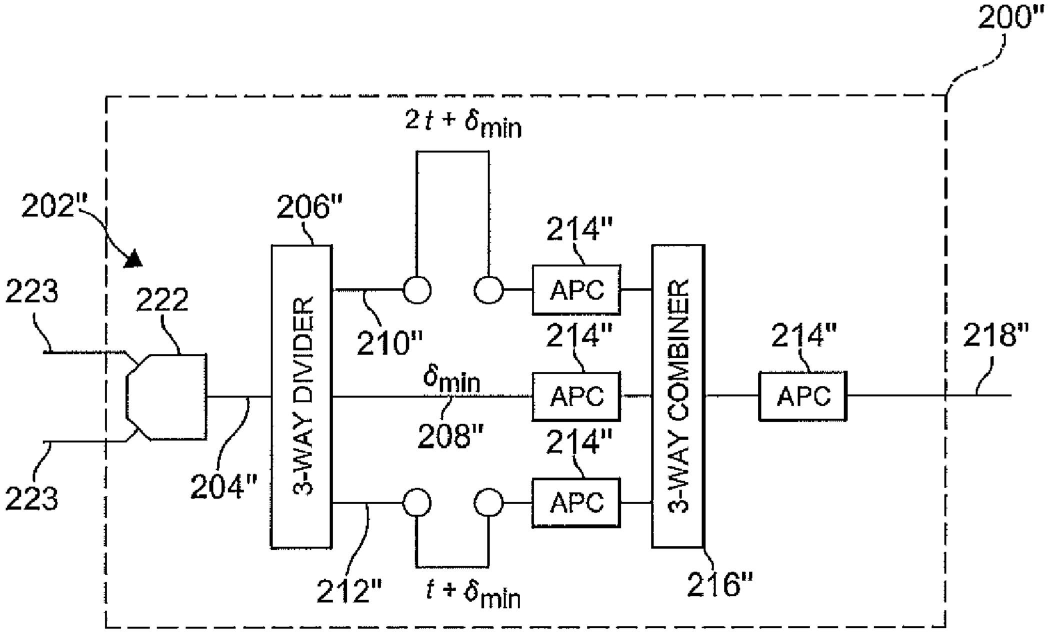
FIG. 8 is a schematic representation of a signal conditioning device according to another embodiment of the present invention.

FIG. 8 illustrates a TAP device 200" according to another embodiment of the present invention similar to the TAP device 200 of FIG. 6 except as described below. Structure repeated from the description of FIG. 6 includes the same reference numeral and a double-prime (") symbol. As shown, a signal condition circuit 202" includes a power combiner 222 coupled to an input 204" to combine a plurality of received signals into a single input signal to be transmitted through the input 204" for conditioning. As a non-limiting example the power combiner 222 is a two-way power combiner having a pair of divided inputs 223, each of the divided inputs 223 capable of receiving a signal (e.g. RF signal). However, any number of divided inputs can be used.

Figure 9:
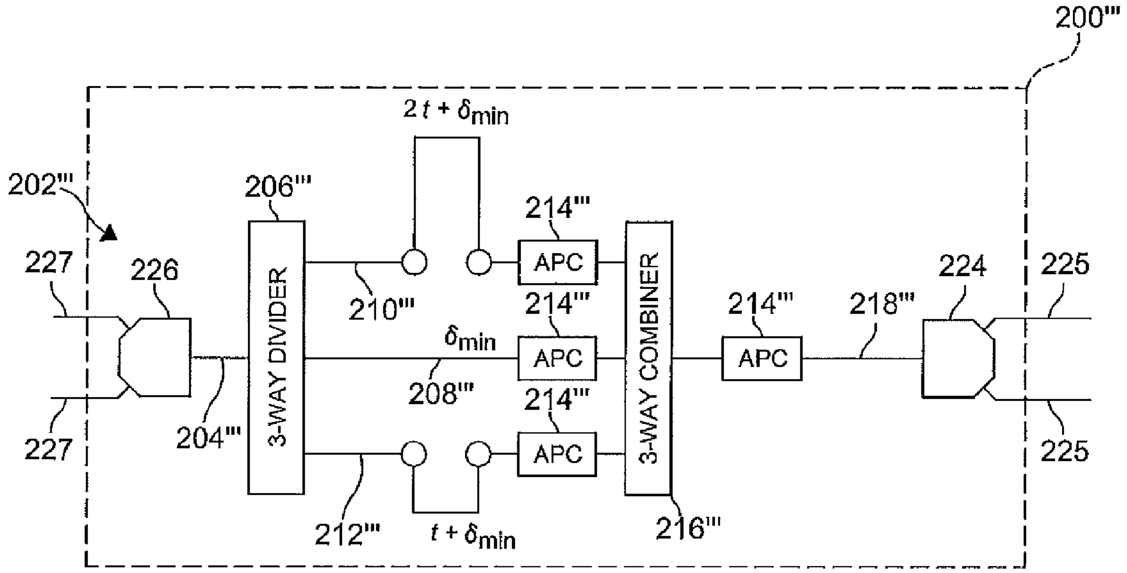
FIG. 9 is a schematic representation of a signal conditioning device according to another embodiment of the present invention.

FIG. 9 illustrates a TAP device 200''' according to another embodiment of the present invention similar to the TAP device 200 of FIG. 6 except as described below. Structure repeated from the description of FIG. 6 includes the same reference numeral and a triple-prime (''') symbol. As shown, a signal condition circuit 202''' includes a power divider 224 and a power combiner 226. As a non-limiting example the power divider 224 is a two-way power divider having a pair of divided outputs 225. However, any number of divided outputs can be used. The power divider 224 is coupled to an output 218''' to divide the output signal into a plurality of divided output signals. The two-way power combiner 226 is coupled to an input 204''' to combine a plurality of received signals into a single input signal to be transmitted through the input 204''' for conditioning. As a non-limiting example the power combiner 226 is a two-way power combiner having a pair of divided inputs 227, each of the divided inputs 227 capable of receiving a signal (e.g. RF signal). However, any number of divided inputs can be used.

Figure 10:
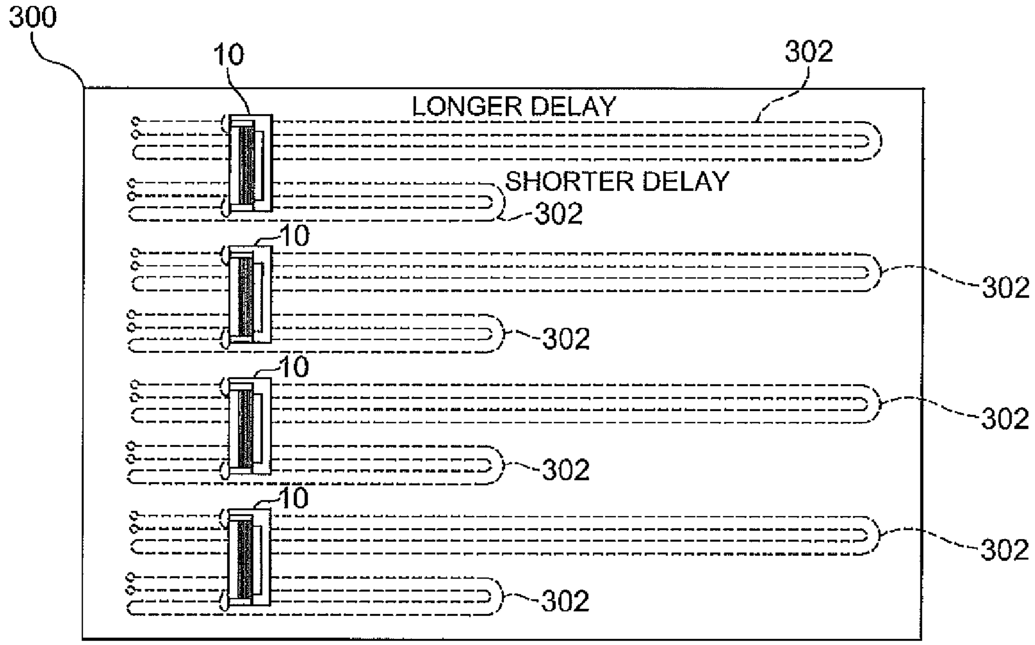
FIG. 10 is a schematic representation of the signal conditioning device of FIG. 1 mounted to a circuit board according to another embodiment of the present invention.

FIG. 10 illustrates a plurality of the TAP devices 10 mounted on a circuit board 300. It is understood that any number and combination of TAP devices 10, 100, 200, 200', 200", 200''' can be electrically coupled to the circuit board 300. The circuit board 300 includes a plurality of conductive transmission lines 302 disposed thereon or embedded therein. Each of the transmission lines 302 has a pre-determined length to provide a time delay to a signal transmitted therethrough. As a non-limiting example, any of the time delay paths 28, 30, 108, 110, 112, 208, 210, 212, 208', 210', 212', 208", 210", 212", 208''', 210''', 212''' of any of the TAP devices 10, 100, 200, 200', 200", 200" can be electrically coupled to at least one of the transmission lines 302 and routed back to the associated signal condition circuit 22, 102, 202, 202', 202", 202'" to provide a desired time delay.

Figure 11:
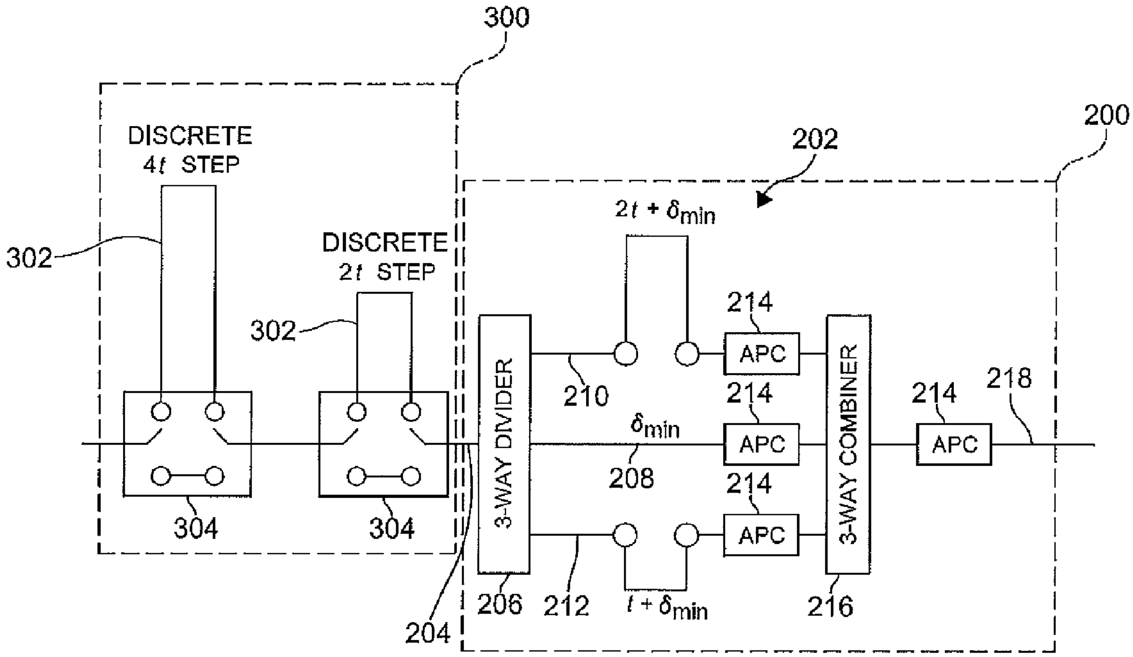
FIG. 11 is a schematic representation of the signal conditioning device of FIG. 6 in signal communication with a plurality of transmission lines according to an embodiment of the present invention.

FIG. 11 illustrates the signal conditioning circuit 202 in electrical communication with a plurality of transmission lines 302 of the circuit board 300. As a non-limiting example, a signal can be routed through any number of the transmission lines by at least one of a plurality of switches 304. It is further understood the switches 304 can be used to bypass the transmission lines 302 so that no time delay is introduced to a signal prior to the input 24, 104, 204 of the respective TAP device 10, 100, 200, 200, 200', 200", 200'". In particular, one of the switches 304 routes an incoming signal through one of the transmission lines 302 having a discrete time delay step of 4t and another one of the switches 304 routes the incoming signal through one of the transmission lines 302 having a discrete time delay step of 2t.

The TAP device 10, 100, 200, 200, 200', 200", 200'" of the present invention is implemented using RFIC technology to minimize an overall package size and provide a lower power consumption, a lower cost, and a simplicity of use. The TAP device 10, 100, 200, 200, 200', 200", 200'" provides selective, independent, and variable control over a time delay, amplitude, and phase of a radio frequency signal. Specifically, the invention provides a time delay while substantially maintaining a phase of the carrier constant.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A signal conditioning device comprising:
- a substrate including at least one transmission line integrated therewith;
- a power divider for receiving an input signal and dividing the input signal into a plurality of divided signals;
- a plurality of time delay paths, each of the time delay paths coupled to an output of the power divider to receive at least one of the divided signals, wherein at least one of the time delay paths is in signal communication with the at least one transmission line to define a time delay associated therewith;
- a control device in signal communication with at least one of the time delay paths and controlling at least one of a phase shift and an amplitude of at least one of the divided signals; and
- a power combiner for receiving the divided signals and combining the signals into an output signal.

2. The device according to claim 1, wherein the power divider is one of a two-way power divider and a three-way power divider.

3. The device according to claim 1, wherein at least one of the time delay paths has a different length and associated time delay than another one of the time delay paths.

4. The device according to claim 1, wherein the control device includes a phase shifter.

5. The device according to claim 1, wherein the control device includes a variable gain amplifier.

6. The device according to claim 1, wherein the control device is at least one of an amplitude/phase control device and a variable attenuator.

7. The device according to claim 1, wherein the control device includes an I and Q vector modification circuit.

8. The device according to claim 1, further comprising a second power combiner in signal communication with the power divider and adapted to receive a plurality of signals, combine the signals, and transmit a single input signal to the power divider.

9. The device according to claim 1, further comprising a second power divider in signal communication with the power combiner and adapted to receive the output signal, divide the output signal, and transmit a plurality of divided output signals.

10. The device according to claim 1, further comprising a second control device in signal communication with an output of the power combiner to control at least one of a phase and an amplitude of the output signal.

11. A signal conditioning device comprising:
- a substrate including at least one transmission line integrated therewith;
- a power divider for receiving an input signal and dividing the input signal into a plurality of divided signals;
- a plurality of time delay paths, each of the time delay paths coupled to an output of the power divider to receive at least one of the divided signals, wherein at least one of the time delay paths is in signal communication with the at least one transmission line to define a time delay associated therewith;
- a phase shifter circuit in signal communication with at least one of the time delay paths for controlling a phase of at least one of the divided signals, independent of the time delay associated therewith; and
- an amplitude control circuit in signal communication with at least one of the time delay paths for controlling an amplitude of at least one of the divided signals, independent of the time delay associated therewith; and
- a power combiner for receiving the divided signals and combining the signals into an output signal.

12. The circuit according to claim 11, wherein the at least one transmission line is embedded in the substrate.

13. The circuit according to claim 11, wherein at least one of the time delay paths has a different length and associated time delay than another one of the time delay paths.

14. The circuit according to claim 11, wherein the phase shifter circuit and the amplitude control circuit are packaged in a single amplitude/phase control device.

15. The circuit according to claim 11, wherein the amplitude control circuit is a variable gain amplifier.

16. The circuit according to claim 11, wherein at least one of the phase shifter circuit and the amplitude control circuit includes an I and Q vector modification circuit.

17. The circuit according to claim 11, further comprising a second power combiner in signal communication with the power divider and adapted to receive a plurality of signals, combine the signals, and transmit a single input signal to the power divider.

18. The circuit according to claim 11, further comprising a second power divider in signal communication with the power combiner and adapted to receive the output signal, divide the output signal, and transmit a plurality of divided output signals.

19. The device according to claim 11, further comprising a control device in signal communication with an output of the power combiner to control at least one of a phase and an amplitude of the output signal.

20. A signal conditioning device comprising:
- a substrate including at least one transmission line integrated therewith; and
- a die mounted on the substrate, the die including a signal conditioning circuit having: a power divider for receiving an input signal and dividing the input signal into a plurality of divided signals; a plurality of time delay paths, each of the time delay paths coupled to an output of the power divider to receive at least one of the divided signals, wherein at least one of the time delay paths is in signal communication with the at least one transmission line to define a time delay associated therewith; a plurality of control devices for controlling at least one of a phase shift and an amplitude of at least one of the divided signals, wherein at least one of the control devices is disposed along each of the time delay paths and in signal communication therewith; and a power combiner for receiving the divided signals and combining the signals into an output signal.

* * * * *